United States Patent [19]

Hall et al.

[11] Patent Number: 5,144,113
[45] Date of Patent: Sep. 1, 1992

[54] ELECTRICALLY HEATED DEICER FOR AIRCRAFT BLADES

[75] Inventors: Henry B. Hall, Madison, Conn.; James A. Cook, Agawam, Mass.

[73] Assignee: Safeway Products, Inc., Middletown, Conn.

[21] Appl. No.: 277,698

[22] Filed: Nov. 30, 1988

[51] Int. Cl.5 .............................................. H05B 3/16
[52] U.S. Cl. ................................................... 219/549
[58] Field of Search .............. 219/549, 522, 528, 535, 219/530; 244/134 D

[56] References Cited

U.S. PATENT DOCUMENTS

| | | | |
|---|---|---|---|
| 2,564,325 | 8/1951 | Coonly | 244/134 D |
| 2,743,890 | 5/1956 | LaRue | 244/134 D |
| 2,757,273 | 7/1956 | Taylor | 244/134 D |
| 3,569,602 | 3/1971 | Norem | 219/530 |
| 3,781,526 | 12/1973 | Damron | 219/549 |
| 3,800,121 | 3/1974 | Dean et al. | 244/134 D |
| 3,825,371 | 7/1974 | Roder et al. | 244/134 D |
| 4,203,198 | 5/1980 | Hackett et al. | 219/528 |
| 4,386,749 | 7/1983 | Sweet et al. | 244/134 D |
| 4,486,649 | 12/1984 | Lane, Jr. | 219/549 |
| 4,764,665 | 8/1988 | Orban et al. | 219/549 |

FOREIGN PATENT DOCUMENTS

| | | |
|---|---|---|
| 932600 | 3/1948 | France . |
| 1576429 | 10/1980 | United Kingdom . |
| 2121745 | 1/1984 | United Kingdom . |

*Primary Examiner*—Geoffrey S. Evans
*Attorney, Agent, or Firm*—Hayes & Reinsmith

[57] ABSTRACT

A deicer for affixment to a propeller blade or helicopter blade with an electrical resistance etched foil heater on a flat electrically non-conductive face of a wear resistant body, the body having tapered side and end edges extending beyond the foil heater. A reinforced non-conductive mesh is disposed within the body.

1 Claim, 1 Drawing Sheet

ELECTRICALLY HEATED DEICER FOR AIRCRAFT BLADES

BACKGROUND OF THE INVENTION

This invention relates to an electrical resistance type deicer heater for use on propeller blades, helicopter rotor blades, etc. utilizing non-metallic and non-conductive blade structures such as reinforced fiberglass rather than the conventional metal structures which are standard in the art. It is well known to use electrical deicer heaters to remove ice from the blades, the necessary power being supplied in a conventional manner from the aircraft itself. In a typical prior art structure, the electrical resistance heater whether made from discrete wires or from an etched foil, was encapsulated in a sandwich between layers of non-conducting materials and was affixed to the blade in the desired location, typically as shown in U.S. Pat. No. 4,386,749. Such deicers, because of their weight, required careful placement of the heater to ensure that the propeller or rotor will remain in static and dynamic balance.

With the advent of improved propeller technology, it has been determined that a light weight and extremely durable composite construction utilizing little or no metal can be fabricated to produce a propeller blade capable of being rotated at the desired high speeds while securing all of the desired advantages of lighter weight, resistance to erosion in use, etc.

In order to devise suitable deicing heaters for use with such composite blades and rotors, each heater must avoid introducing unwanted mass while retaining the durability and reliability of the prior art. It is therefore a primary object of this invention to provide a deicer heater of reduced cross sectional thickness and of lighter weight than conventional deicers without sacrificing durability and serviceability.

It is another object of this invention to provide a heater of the electrical resistance type which reduces the cost of the deicer unit by requiring less material and less labor while retaining the advantages of durability and resistance to erosion, etc.

It is still a further object of this invention to provide a deicer pad that can be easily removed after extensive use resulting in severe wear.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the ways in which the principles of the invention are employed.

SUMMARY OF THE INVENTION

The present invention contemplates a deicer of the electrical resistance heater type for mounting on a non-electrically conducting surface of a propeller blade for aircraft use and/or a rotor blade for helicopter use, the electrical heater being preferrably of the etched foil type with the foil affixed to a thin flat flexible structurally reinforced insulating body on one side of the foil with the heater intended in the preferred embodiment for being mounted or affixed to the propeller blade with the exposed foil heater in contact with the propeller blade.

DETAILED DESCRIPTION

Figure 1:
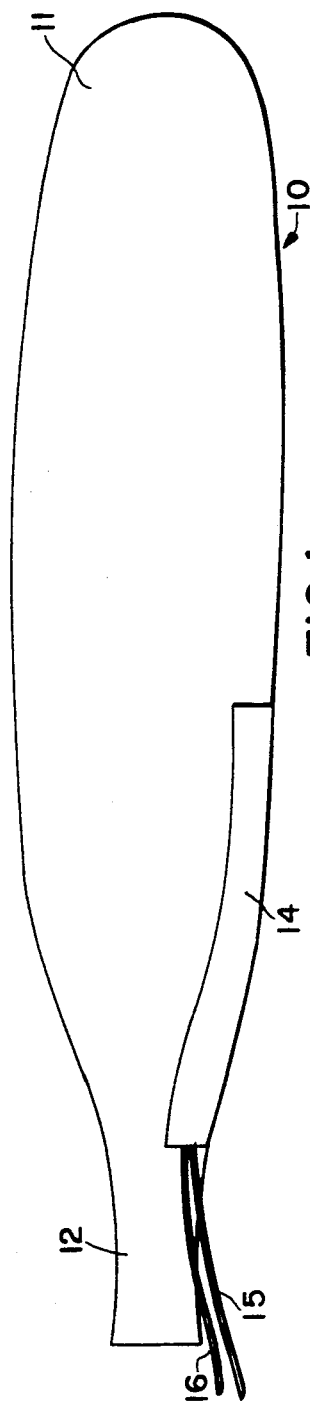
FIG. 1 is a top plan view of a typical propeller blade showing a deicer in position.

Referring particularly FIG. 1, a suitable propeller blade 10 is shown as having a tip portion 11 and a root portion 12, the construction of the blade being of composite materials such as reinforced fiberglass such that the surface of the blade itself is a non-conductive element. Alternatively and in accordance with the present invention, the blade 10 can be provided with non-conducting surface portions without departing from the spirit of the present invention. A deicer pad designated 14 is affixed to the blade as hereinafter described and the electrical leads 15 and 16 are provided for connection to a suitable power source on the aircraft. It should be understood that blade 10 can be a blade from a two bladed propeller, or a multiple bladed propeller, a rotor blade for helicopters, or the like and that the shape of the blade and the specific details of construction are not deemed to be part of the present invention. The fact remains, however, that propeller blades tend to "ice up" near the root portion of the blade and hence the deicer pad 14 is shown in proximity to the root portion.

Figure 2:
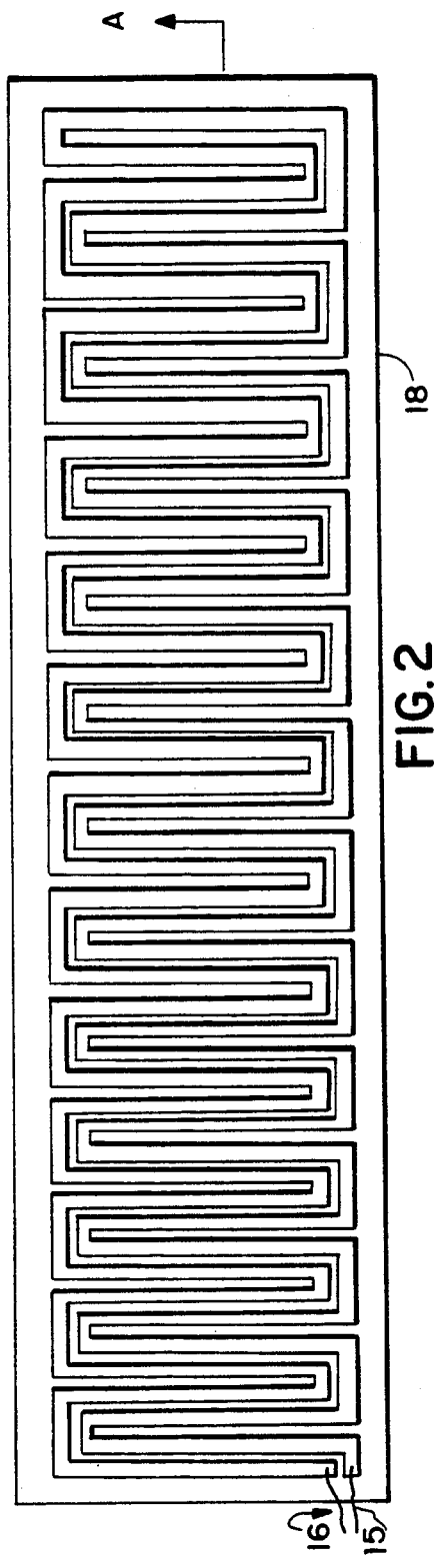
FIG. 2 is a bottom plan view of a foil type electrical resistance heater on a supporting body.
Figure 3:
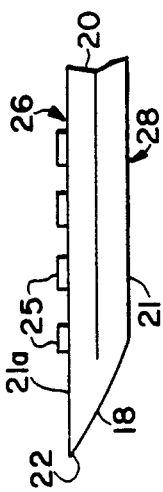
FIG. 3 is an enlarged partial cross section view generally taken at the arrow A of FIG. 2 showing a preferred form of construction.

The electrical heater assembly shown in FIG. 2 is a conventional foil construction of the type disclosed in the aforementioned U.S. Pat. No. 4,386,749 and it is emphasized that the specific nature of the conducting pattern placed on a substrate 18 does not form a part of the present invention and is a matter of choice. It is however a principal goal of the present invention to produce an exceedingly light weight electrical resistance heater and, in that regard, it has been found that using a foil-type heater of very thin cross section offers significant weight advantages as compared to more conventional "wire" type heaters. The foil pattern is applied by any suitable technique to the substrate 18 and may utilize a manufacturing techniques as may be desired. As more clearly seen in the enlarged cross section of FIG. 3, substrate 18, in the preferred embodiment, is a cured neoprene rubber sheet having a reinforcing nylon mesh 20 disposed between its two faces 21 and 21a, the mesh extending only partially to the edge 22 of the substrate thereby leaving an unsupported portion of the neoprene extending beyond the reinforcing mesh 20 thereby to provide a highly flexible tapered edge extending all around the substrate 18, if desired.

That unsupported edge results in a tapered edge that greatly facilitates placement of the composite heater pad 14 on the blade with minimum disruption of the desired blade air foil. The unsupported edge is flexible and tapered to assist in the desired "clean" mounting. The foil elements generally designated 25 are also shown in enlarged cross section to emphasize the fact that face 26 of the heater is directly affixed to the non-conducting blade or blade portion. Such an arrangement effectively reduces the weight of the heater by eliminating one side of the heater "sandwich" heretofore required for mounting on conventional metal propellers. Moreover the improved construction of the present invention greatly facilitates the maintenance of the desired air foil cross section by adding minimum weight and minimum thickness to the blade; such an arrangement also facilitates the issue of balancing of a multi-bladed propellers.

The outer face 28 of heater 14 is, in effect, the sole protection offered to the resistance heater against the erosion brought about by high speed rotation and movement in the air. Moreover such an arrangement facilitates removal after the heater has "aged" to the point where such removal becomes appropriate. By way of illustration only, the pad 14 is affixed to the non-conductive blade 10 through utilization of an adhesive, such as a rubber base adhesive, that is chemically acceptable to the erosion stock typically cured neoprene, to the substrate for the foil heater and the blade material. Of course, the nature of the foil heater with interstices between adjacent heating elements insures that the erosion stock body 18 of heater 14 will also be affixed to blade 10.

Figure 4:
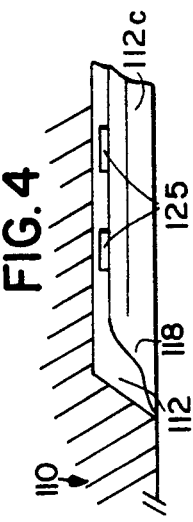
FIG. 4 is an enlarged view partially in cross section showing an alternative embodiment of the heater of this invention mounted on a propeller blade, which blade has been provided with a recess to receive the deicer pad.

An alternate embodiment of the invention is shown in enlarged schematic cross section of FIG. 4 wherein all of the advantages of the present invention can be retained in those situations wherein blade 110 is prepared for deicer mounting through utilization of a suitably formed recess in the blade surface. Blade 110 is shown as having the milled or otherwise formed recess 112 into which is placed the heating device of the present invention. The unsupported edge 118 which extends beyond the reinforcement mesh 120 is again used to facilitate proper mating of the deicer pad to the heater blade with the adhesive filling the interstices between the heating elements 125, the erosion stock and the recess in the blade surface.

It is therefore seen that we have developed a low cost light weight flexible heater for use as a propeller blade deicer or the like, and have done so by a unique construction which offers full protection to the foil heating elements without adding unwanted weight and while permitting full adhesion of the heater to the blade itself.

As will be apparent to persons skilled in the art, various modifications, adaptations and variations of the foregoing specific disclosure can be made without departing from the teachings of this invention.

Having thus described the invention what is claimed is:

1. An electrically heated deicer to be affixed to a propeller blade, a helicopter rotor blade, or other blade for aircraft which blade has at least an electrically non-conductive portion on one surface thereof comprising:

a thin, flat, flexible electrically non-conductive wear-resistant body having opposed uninterrupted faces, a thin flat conductive foil resistance heater disposed along and affixed to a non-conductive face of said wear-resistant body, said non-conductive face of said wear-resistant body with the foil resistance heater thereon intended to be affixed to the non-conductive portion on one surface of the blade, said wear-resistant body having tapered side and end edges extending beyond said thin, flat conductive foil resistance heater for securement to said blade to present an improved air foil shape, said edges being tapered toward the resistance heater side of the body, and a reinforced non-conductive mesh disposed within the wear resistant body.

* * * * *